UNITED STATES PATENT OFFICE.

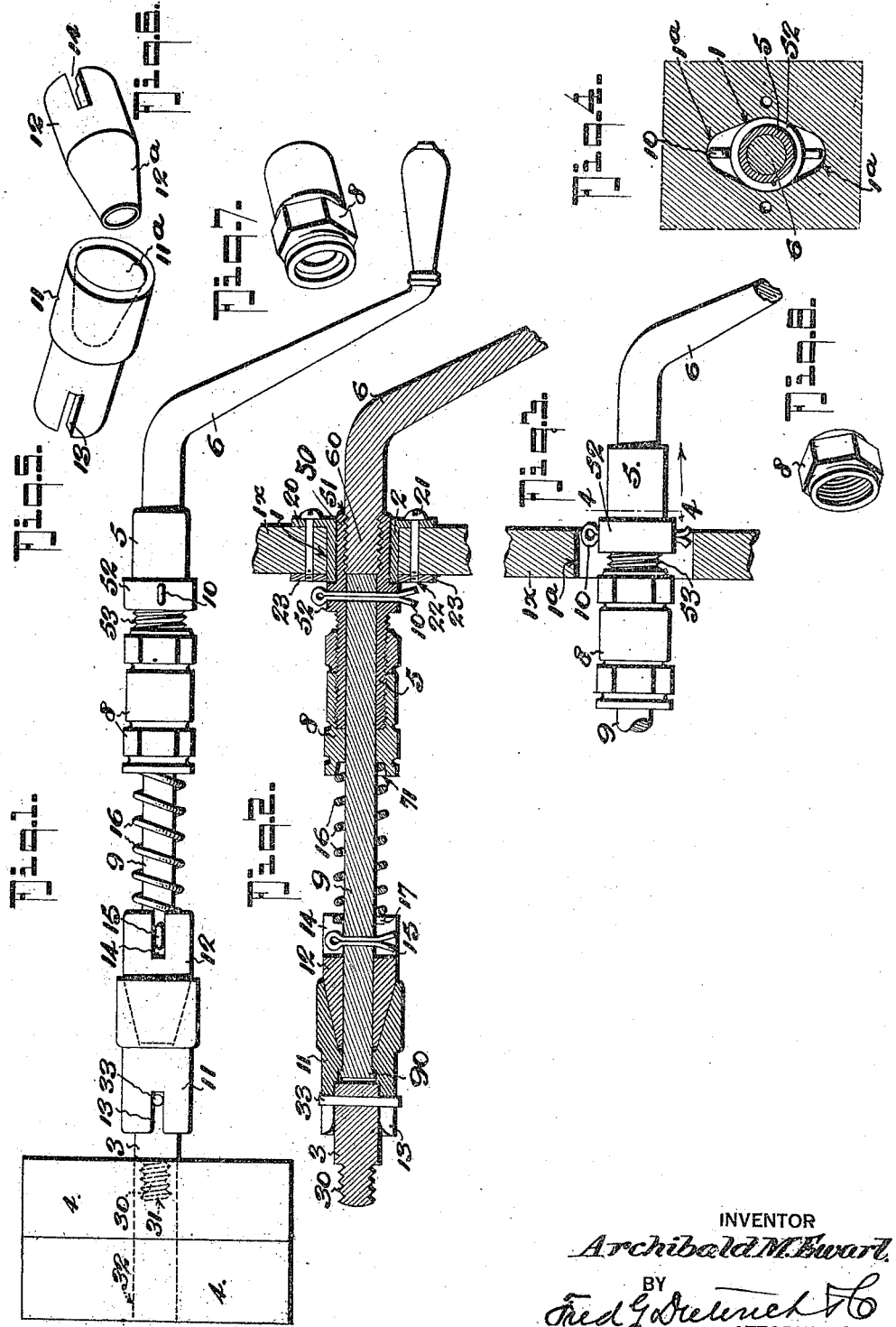

ARCHIBALD M. EWART, OF BARBERTON, OHIO.

MOTOR-WINDING CRANK.

1,238,654.  Specification of Letters Patent.  Patented Aug. 28, 1917.

Application filed April 19, 1917. Serial No. 163,130.

*To all whom it may concern:*

Be it known that I, ARCHIBALD M. EWART, residing at Barberton, in the county of Summit and State of Ohio, have invented a new and Improved Motor-Winding Crank, of which the following is a specification.

My invention has reference to improvements in winding cranks for talking machines and it primarily has for its object to provide an improved construction of crank mechanism of the character stated in which is included a safety device designed for preventing the over winding of the spring and the straining and breaking of the said spring.

My invention also has for its purpose to provide a cranking mechanism of a simple and economical construction, in which the parts are especially designed for being readily applied for use on all classes of talking machines, that can be applied without any material change in the usual way of connecting the winding crank to the motor spring shaft, which can be bodily removed from the motor and the talking machine casing, so that the motor may be elevated for oiling and adjusting, and which effectively serves its intended purpose.

With other objects in view and hereinafter explained, my invention embodies the peculiar construction, and combination of parts set out in the following description, specifically pointed out in the appended claims, and illustrated in the accompanying drawing, in which:

Figure 1 is a plan view of my spring motor winding crank mechanism.

Fig. 2 is a longitudinal section thereof.

Fig. 3 is a plan view of a portion thereof and illustrates the manner it is withdrawn through the casing.

Fig. 4 is a transverse section taken on the line 4—4 and looking in the direction of the arrow.

Fig. 5 is a perspective view of one of the safety clutch members.

Fig. 6 is a similar view of the coöperating clutch member.

Fig. 7 is a detail perspective view of the spring tension adjusting nut.

Fig. 8 is a similar view of the clamp nut that coöperates therewith.

In the practical application of my invention, I form the aperture 1, in the side wall 1$^x$ of the casing, with oppositely disposed lateral extensions 1$^a$—1$^a$, the reason for which will presently appear, and mount within the said aperture a hub-like bearing 2, formed on an escutcheon plate 20 secured to the side of the casing by machine screws 21 which engage threaded apertures 22 in a plate 23 secured to the inner side of the casing, as shown.

3 indicates a plug formed with an externally threaded end 30 that screws into the threaded socket 31 in the motor spring shaft 32, to which the motor springs 4—4 are secured in the usual way.

5 designates a sleeve that includes a hub portion 50 formed with an internally threaded portion 51 for receiving the threaded end 60 of the crank handle 6, and the said hub portion 50 has a collar 52 for bearing against the inner end of the hub bearing 2, as is clearly shown in Fig. 2, by reference to which it will also be seen sleeve 5 includes a long externally threaded bearing 53 on which is mounted an adjusting nut and a jam nut 8, the outer end of the adjusting nut having a socket 71, as shown.

9 represents a steel shaft, one end of which extends into sleeve 5 and is made fast to the said sleeve by a cotter pin 10 that passes through the hub end of the sleeve and the shaft 9.

The outer clutch member 11 has an end socket for slipping onto the plug 3 that is attached to the spring motor shaft and diametrically oppositely elongated slots 13—13 for receiving the ends of a cross pin 33 on the outer end of the plug, as shown.

In the present form the clutch members 11 and 12 are of the male and female cone type, the member 11 having a coniform socket 11$^a$ to receive the cone shaped end 12$^a$ of the member 12 and the member 12 has elongated slots 14 to receive the cotter pin 15 which passes through the shaft 9.

16 indicates a coil tension spring mounted on the crank shaft, one end of which seats in the socket 71 of the adjusting nut 8 and the other end seats in a like socket 17 on the inner end of the clutch member 12.

The outer end of shaft 9 has a head portion 90 that prevents the clutch members 11—12 slipping beyond the inner end of the said shaft when adjusting the parts to the operative position.

By providing a long bearing sleeve mounted at one end in the side of the casing and providing a plug bearing 3 that forms, as it were, a fixed part of the spring motor shaft, a substantially rigid mounting is provided for the operating parts, which, when the escutcheon with its hub is removed from the casing, may be bodily pulled out through the casing side, by holding the same with the cotter pins in position to aline the lateral extensions of the aperture in the casing end and are as readily shoved back through the said aperture to connect with the plug bar 3.

It is obvious that by coöperatively combining the several parts that constitute the operating mechanism, in the manner shown and described, the entire mechanism can be conveniently disconnected from the motor, when it is desired to elevate the motor for oiling, and can be as readily reapplied when the motor is put back in the operative position.

The tension on the slip clutch members 11—12 can be readily adjusted to suit the desired requirements by proper adjustment of the nut 8.

My construction of crank mechanism is such that it is adapted for use on all classes of talking machines and when the clutch members are assembled in the operative position, they form a part of the winding handle.

The crank handle proper can be removed at any time without removing the other coöperative parts, by simply unscrewing it from the head end of the sleeve.

This application is for a modification and improvement on the construction shown in my Patent #1,232,779, issued July 10, 1917, and in this application I make no generic claim to the structure which is shown in that patent.

From the foregoing description taken in connection with the accompanying drawing, it is thought the complete construction, operation and advantages of my invention will be readily understood by those skilled in the art.

What I claim is:

1. A winding crank mechanism for talking machines comprising a crank shaft, two elements of a clutch member mounted on said crank shaft, one of said elements being free to turn on the crank shaft, the other of said elements having longitudinal motion on the crank shaft, means for keying said other element against turning on the crank shaft, a spring device for holding said clutch elements in clutching engagement, said first clutch element having provision for connecting with the spring motor of the talking machine, said clutch elements having male and female cone clutching surfaces.

2. A winding crank mechanism for talking machines comprising a crank shaft, two elements of a clutch member mounted on said crank shaft, one of said elements being free to turn on the crank shaft, the other of said elements having longitudinal motion on the crank shaft, means for keying said other element against turning on the crank shaft, a spring device for holding said clutch elements in clutching engagement, said first clutching element having provisions for connecting with the spring motor of the talking machine, said clutch elements having male and female cone clutching surfaces, and a spring tension adjusting device on said crank shaft adjusting the tension of the spring that holds the clutch elements in engagement.

ARCHIBALD M. EWART.